US011822892B2

(12) United States Patent
Pfitzmann et al.

(10) Patent No.: US 11,822,892 B2
(45) Date of Patent: Nov. 21, 2023

(54) AUTOMATED NATURAL LANGUAGE SPLITTING FOR GENERATION OF KNOWLEDGE GRAPHS

(71) Applicant: International Business Machines Corporation, Armonk, NY (US)

(72) Inventors: Birgit Monika Pfitzmann, Wettswil (CH); Valery Weber, Gattikon (CH)

(73) Assignee: International Business Machines Corporation, Armonk, NY (US)

(*) Notice: Subject to any disclaimer, the term of this patent is extended or adjusted under 35 U.S.C. 154(b) by 177 days.

(21) Appl. No.: 17/124,451

(22) Filed: Dec. 16, 2020

(65) Prior Publication Data

US 2022/0188524 A1    Jun. 16, 2022

(51) Int. Cl.
*G06F 40/35* (2020.01)
*G06N 5/02* (2023.01)
*G06F 40/205* (2020.01)

(52) U.S. Cl.
CPC ............ *G06F 40/35* (2020.01); *G06F 40/205* (2020.01); *G06N 5/02* (2013.01)

(58) Field of Classification Search
CPC .............................. G06F 40/35; G06F 40/205
See application file for complete search history.

(56) References Cited

U.S. PATENT DOCUMENTS

| 11,042,709 B1* | 6/2021 | Pham ................... G06F 40/205 |
| 2011/0093467 A1* | 4/2011 | Sharp .................. G06F 16/2228 |
| | | 707/E17.069 |
| 2014/0136188 A1 | 5/2014 | Wroczyński |
| 2015/0051900 A1* | 2/2015 | Kimelfeld ............. G06F 40/211 |
| | | 704/9 |
| 2016/0151918 A1* | 6/2016 | Stoyanchev ........... B25J 13/003 |
| | | 704/9 |
| 2017/0024476 A1 | 1/2017 | Gramatica |
| 2017/0286390 A1* | 10/2017 | Yashpe ................. G06F 40/253 |
| 2019/0095522 A1 | 3/2019 | Galitsky |
| 2019/0332620 A1* | 10/2019 | Wason .................... G06F 40/30 |

(Continued)

FOREIGN PATENT DOCUMENTS

| CA | 2305875 A1 * | 4/1999 | |
| CA | 2422490 C * | 10/2010 | ........... G06F 16/258 |
| WO | WO-0186489 A2 * | 11/2001 | ........... G06F 16/345 |

OTHER PUBLICATIONS

Daniel Marcu. 1998. A surface-based approach to identifying discourse markers and elementary textual units in unrestricted texts. In Discourse Relations and Discourse Markers.*

(Continued)

*Primary Examiner* — Anne L Thomas-Homescu
(74) *Attorney, Agent, or Firm* — Michael A. Petrocelli

(57) ABSTRACT

Splitting a natural language sentence into primitive phrases retaining relations of terms includes receiving a natural language sentence, building a parse tree from the natural language sentence using a natural language parser, and recursively identifying discourse markers in subtrees of the parse tree, starting with the highest ranking discourse marker in the parse tree, thereby separating each of the respective subtrees at the respective discourse marker using a set of predefined rules until a set of basic subtrees remains. The recursive identification includes looking-ahead for identifying long ranging discourse markers before identifying local discourse markers.

23 Claims, 10 Drawing Sheets

(56) References Cited

U.S. PATENT DOCUMENTS

2021/0034701 A1* 2/2021 Fei .................. G06N 3/0454
2022/0027707 A1* 1/2022 Wu .................. G06N 3/045

OTHER PUBLICATIONS

"Tgrep & TGrep2", Instructions for set up, © 2003 & 2004 by tiflo, 7 pages, <https://web.stanford.edu/dept/linguistics/corpora/cas-tut-tgrep.html>.

Bird, et al., "7. Extracting Information from Text", Natural Language Processing with Python, Analyzing Text with the Natural Language Toolkit, document built on Wed Sep. 4, 2019, 17 pages, <https://www.nltk.org/book/ch07.html>.

Joshi, Prateek, "Knowledge Graph—a Powerful Data Science Technique to Mine Information from Text (with Python code)", Analytics Vidhya, Oct. 14, 2019, 22 pages, <https://www.analyticsvidhya.com/blog/2019/10/how-to-build-knowledge-graph-text-using-spacy/>.

Kitaev, et al., "Berkeley Neural Parser", GitHub, nikitakit/self-attentive-parser, last printed Dec. 16, 2020, 13 pages, <https://github.com/nikitakit/self-attentive-parser>.

Kitaev, et al., "Constituency Parsing with a Self-Attentive Encoder", Computer Science > Computation and Language, arXiv:1805.01052v1 [cs.CL], May 2, 2018, 12 pages, <https://arxiv.org/abs/1805.01052>.

Mell, et al., "The NIST Definition of Cloud Computing", National Institute of Standards and Technology, Special Publication 800-145, Sep. 2011, 7 pages.

Rohde, Douglas, "Tgrep2 User Manual (version 1.2)", Aug. 17, 2001, 15 pages, <citeseerx.ist.psu.edu/viewdoc/download?doi=10.1.1.22.7702&rep=rep1&type=pdf>.

Taylor, et al., "The Penn Treebank: an Overview", In: Abeillé A. (eds) Treebanks. Text, Speech and Language Technology, vol. 20., Springer, 2003, pp. 5-22, <https://link.springer.com/chapter/10.1007/978-94-010-0201-1_1>.

* cited by examiner

AUTOMATED NATURAL LANGUAGE SPLITTING FOR GENERATION OF KNOWLEDGE GRAPHS

BACKGROUND

The invention relates generally to natural language processing techniques, and more particularly to splitting a natural language sentence into primitive phrases retaining relations between terms.

Large and small enterprises, as well as government bodies and research institutes have to organize large amounts of unstructured data (e.g., text). One way to organize such data is the use of knowledge graphs. These can be structured to reflect relations between document items using the links between such document items and also express the strength of the relationship. However, building such knowledge graphs is a complex and time-consuming task that often needs to be performed manually.

On the other hand, knowledge graphs can be advantageous for large document collections. However, knowledge graphs creation cannot be conducted unattended, i.e., in an unsupervised way, especially without a lot of manually annotated data.

Further, open information extraction without any domain-specific work is not yet available. Some commercial technologies can extract only "a relation" from texts that are not structured (e.g., new, Wikipedia, etc.). Thus, currently available technologies require a lot of manual intervention in order to build meaningful knowledge graphs from texts with more or less complex sentence structures. Typically used rules such as, e.g., in spacy.io or SystemT (an IBM® natural language product) are based on simple word-order patterns and often fail to produce the correct relation from the complex sentences that can be found in scientific texts, and administrative or legal texts.

SUMMARY

Text analysis capabilities of known solutions are often limited so that a direct use of the results may not be suitable for automatically building a knowledge graph. Therefore, there is a need to overcome limitations of the known technology including machine-learning-based systems and simple rules and/or word-order patterns.

According to one aspect of the present invention, a computer-implemented method for splitting a natural language sentence into primitive phrases retaining relations of terms may be provided. The method may comprise receiving a natural language sentence and building a parse tree from the natural language sentence using a natural language parser. Furthermore, the method may include recursively identifying discourse markers in subtrees of the parse tree, starting with the highest-ranking discourse marker in the parse tree, thereby separating each of the respective subtrees at the respective discourse marker using a set of predefined rules until a set of basic subtrees remains. Thereby, the recursive identification may include looking-ahead for identifying long ranging discourse markers before identifying local discourse markers.

According to another aspect of the present invention, a natural language splitting system for splitting a natural language sentence into primitive phrases retaining relations of terms may be provided. The system may include a memory and a processor operatively coupled to the memory, where the memory may store program code portions that, if executed by the processor, may enable the processor to receive a natural language sentence and build a parse tree from the natural language sentence using a natural language parser. Additionally, the program code portions may enable the processor to recursively identify discourse markers in subtrees of the parse tree, starting with the highest ranking discourse marker in the parse tree, thereby separating each of the respective subtree at the respective discourse marker using a set of predefined rules, until a set of basic subtrees remains; thereby, the recursive identification may include look-ahead in order to identify long ranging discourse markers before local discourse markers are identified.

The proposed computer-implemented method for splitting a natural language sentence into primitive phrases retaining relations of terms may offer multiple advantages, technical effects, contributions and/or improvements:

The proposed system and the related method, through its ability to clearly and comprehensively separate complex sentences or paragraphs in natural language, may provide a splitting system that enables real relations to be maintained. This may also apply if these are not contingent in the text and avoid spurious relations. Due to the set of words used for the analysis, separating and splitting the here proposed solution contributes to the idea of explainable AI (artificial intelligence) if the resulting relations are used in knowledge graphs.

The proposed algorithms may also be extended with a logical structure that goes beyond the sentences and phrases and may allow confidence levels and different types of divisions for different types of relations that may be analysed on top of that.

Writers of subject-matter rules may focus on the subject-matter rather than the complexity of the underlying language. Consequently, the method and system proposed here may also be used for a variety of different languages. More correct results can be expected due to the used and pre-defined rules, and thus, ultimately more correct applications, e.g., where to search for a mineral or what pharmaceutical structures to try. In traditional systems, subject-matter expert may have to write the rules repeatedly, i.e., from scratch, where in the proposed method and the related system experts may have predefined the rules for general use. However, also here, additional rules may be added to expand the rule set for new, so far unaddressed subject-matter areas.

This may allow a faster start-up for new knowledge graphs to be built that become more and more important for a customer or society, like, the recent Covid-19 knowledge graph initiative.

It also overcomes the nowadays used basic language parsers not relying on rules but being trained from large corpuses of pairs of sentences which may also be manually annotated. For the proposed concept, it is not necessary that such corpus exists, and thus also small teams can define the required rules for the proposed system.

In the following, additional embodiments of the inventive concept will be described.

According to an embodiment, a tree automaton may be used for the recursive identification of the discourse markers. TGrep2, which is based on a trained machine learning system; however, in general, other tree analysis systems can also be used.

According to another embodiment, each component of the set of basic subtrees may represent a basic relation of terms. This may, e.g., be represented as a subject and a related characteristic or as two subjects. After a separation of a longer complex text—in particular, via sentences—in such basic relations, an automatic construction of a knowledge graph based on the isolated basic relations may become easily possible.

Hence, and according to an embodiment, the method may also include extracting relations from the set of basic subtrees. They may then build the basic ingredients for a subsequent knowledge graph which may be built without, or minimal, human intervention. A manual annotation may be omitted.

Thus, and according to an advantageous embodiment, the method may additionally include building a knowledge graph using the extracted relations as input. Using this technique, domain specific knowledge graphs of, e.g., highly complex scientific text, administrative and/or legal texts may be produced without high skilled labour.

According to an embodiment, the method may also include recombining basic phrases based on the set of basic subtrees. This may allow expressing the content of a complex sentence with more simple language constructs for a potential, easier and better, comprehension. This technique may also be used as a further basis for automatic debater machines.

According to an embodiment, the method may also include resolving co-references in the natural language sentence before performing the recursive identification. This may make the analysis task for the constituency parser easier. Pronouns like "he", "she", or "it" would be replaced by the respective nouns. This may also ease the split into basic trees and/or basic relations.

According to another embodiment, the method may also include using a configuration component for configuring domain specific terms and/or parameters for selecting a rule out of a set of rules for a discourse marker. The configuration component may be browser-based, and it may enable an easy activation/deactivation of analysis and separation and specific knowledge domains and related to a selected set of discourse markers. Additionally, also other configuration parameters may be set, e.g., speed versus accuracy, the to-be-used discourse marker detection tool, and so on.

According to an embodiment, the method may also include separating a longer natural language text into separate natural language sentences or natural language phrases. This may actually be performed before the here proposed core concept may be applied. It may seem to be a relatively simple task because each sentence should end with a full stop. However, sentence ends may also be separated by semicolons and full stops also be used within chemical formulas, numbers, and so on.

According to an embodiment, the parse tree may either be a constituency-based parse tree or a dependency-based parse tree depending on the selected parser. Generally, both approaches are possible; however, the underlying algorithms may have to be adapted for the use of a specific one of the parsers. This may also be one of the configuration variables to be adjusted by the above-mentioned user interface.

According to an embodiment, the method may also include building the constituency-based parse tree using a constituency parser, one selected out of the group, including a Benepar constituency parser, i.e., the Berkley neural Parser, a Stanford coreNLP constituency parser, a Natural language toolkit constituency parser (NLTP), and an AllenNLP dependency parser.

For the Stanford coreNLP constituency parser, it shall be mentioned that it may provide full syntactic analysis, minimally a constituency (phrase-structure tree) parse of sentences. If a rule-based conversion from constituency parses to dependency parses is available (this is currently the case for English and Chinese, only), then a dependency representation is also generated using this conversion. The constituent-based output can also be saved in TreeAnnotation. The NLTK is one of the leading platforms for building Python programs to work with human language data. It provides easy-to-use interfaces to lexical resources such as WordNet, along with a suite of text processing libraries for classification, tokenization, stemming, tagging, parsing, semantic reasoning, and wrappers for industrial-strength NLP libraries.

Finally, the AllenNLP works best in dependency parsing mode. It provides a platform to develop deep learning models for a plurality of NLP problems along with the infrastructure to easily run them. AllenNLP includes also reference implementations of high-quality models for both core NLP problems (e.g., semantic role labelling) and NLP applications (e.g., textual entailment).

According to a further embodiment, the method may also include combining a parse tree portion directly related to a discourse marker—e.g., directly before and after the discourse marker—with a portion of the parse tree excluding the parse tree portion directly related to the discourse marker. Hence, the trees may overlap partially. However, this may not represent a limitation because by means of the recursively identification, the iterations may only end if basic subtrees are reached which will happen automatically because the subtrees in each recursion step will become smaller than the prior (sub)tree.

According to another embodiment, the recursive identification of the discourse markers may be carried out by proceeding from one side of the parse tree to another side—in particular in addition to the top-down approach. It may be from left to right or vice versa. However, depth comes first.

Furthermore, embodiments may take the form of a related computer program product, accessible from a computer-usable or computer-readable medium providing program code for use, by, or in connection, with a computer or any instruction execution system. For the purpose of this description, a computer-usable or computer-readable medium may be any apparatus that may contain means for storing, communicating, propagating or transporting the program for use, by, or in connection, with the instruction execution system, apparatus, or device.

BRIEF DESCRIPTION OF THE DRAWINGS

It should be noted that embodiments of the invention are described with reference to different subject-matters. In particular, some embodiments are described with reference to method type claims, whereas other embodiments are described with reference to apparatus type claims. However, a person skilled in the art will gather from the above and the following description that, unless otherwise notified, in addition to any combination of features belonging to one type of subject-matter, also any combination between features relating to different subject-matters, in particular, between features of the method type claims, and features of the apparatus type claims, is considered as to be disclosed within this document.

The aspects defined above, and further aspects of the present invention, are apparent from the examples of embodiments to be described hereinafter and are explained with reference to the examples of embodiments, but to which the invention is not limited.

Figure 1:
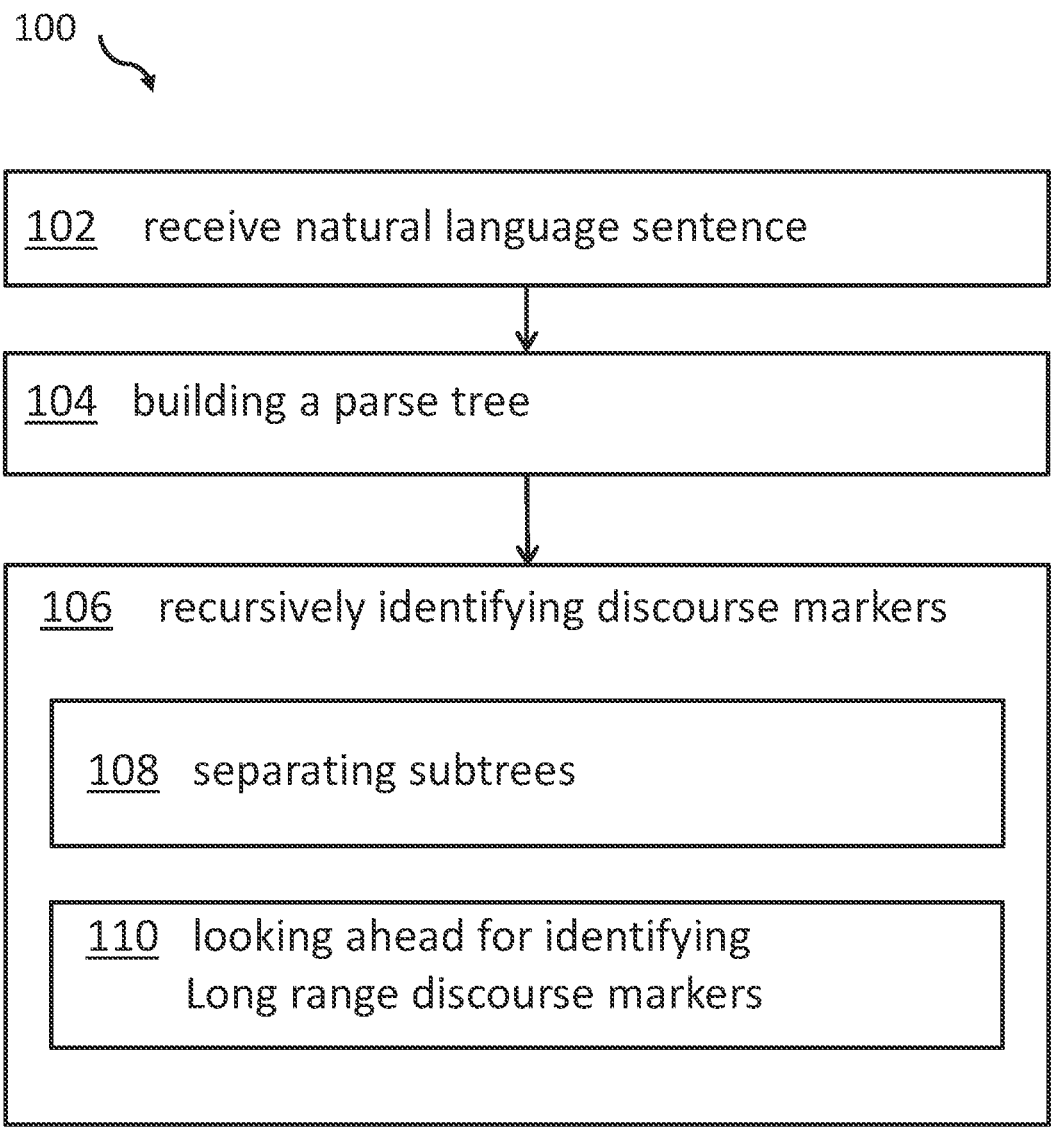
Figure 2:
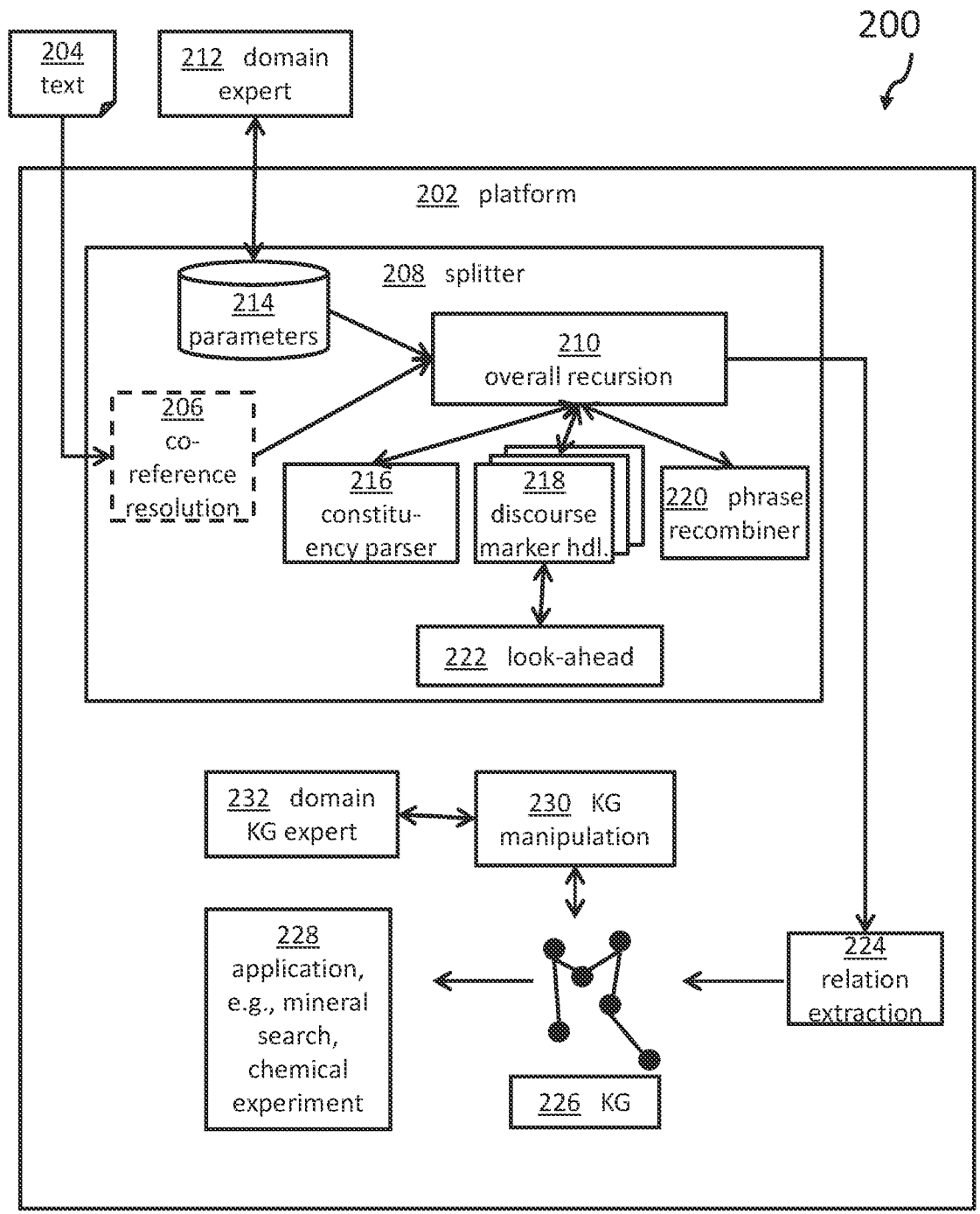
Figure 3:
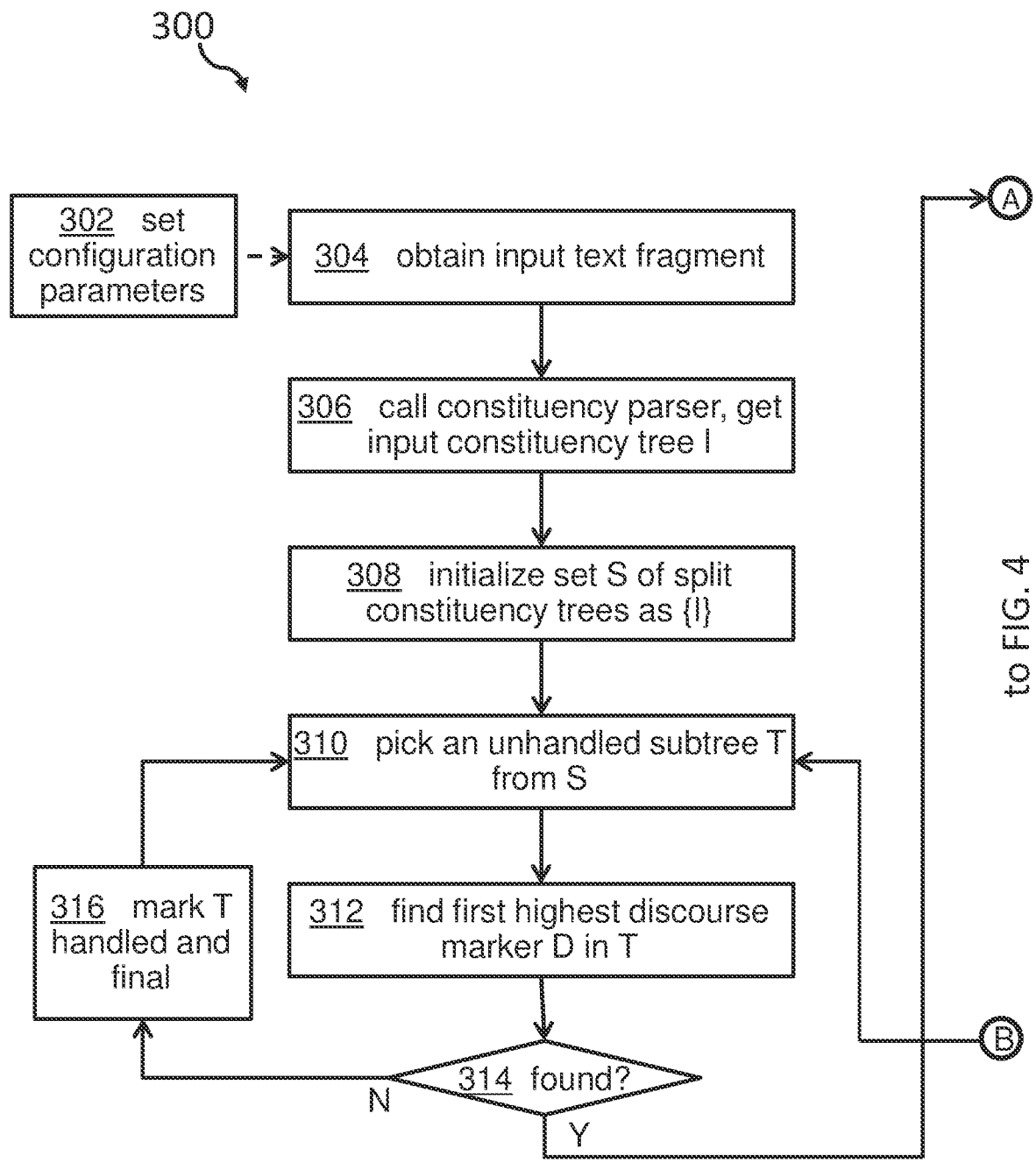
Figure 4:
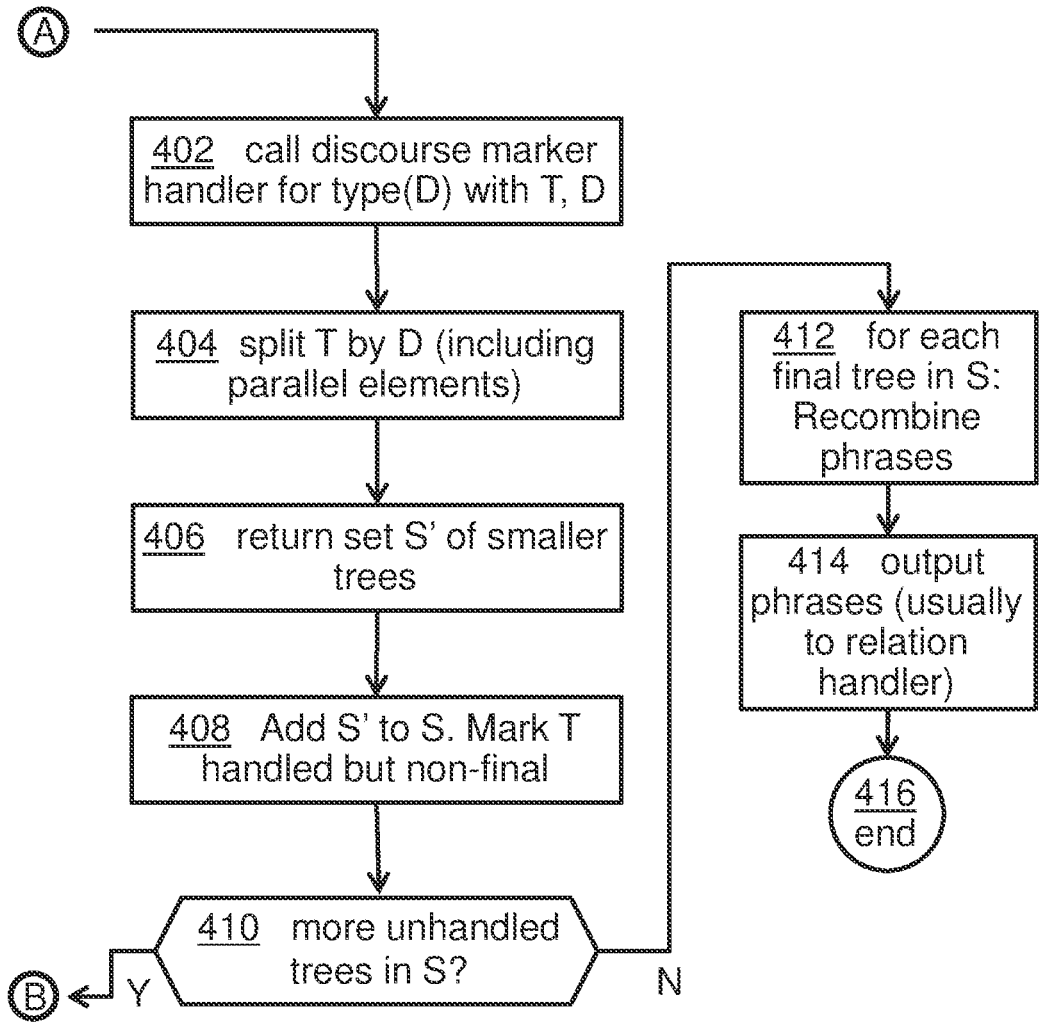
Figure 5:
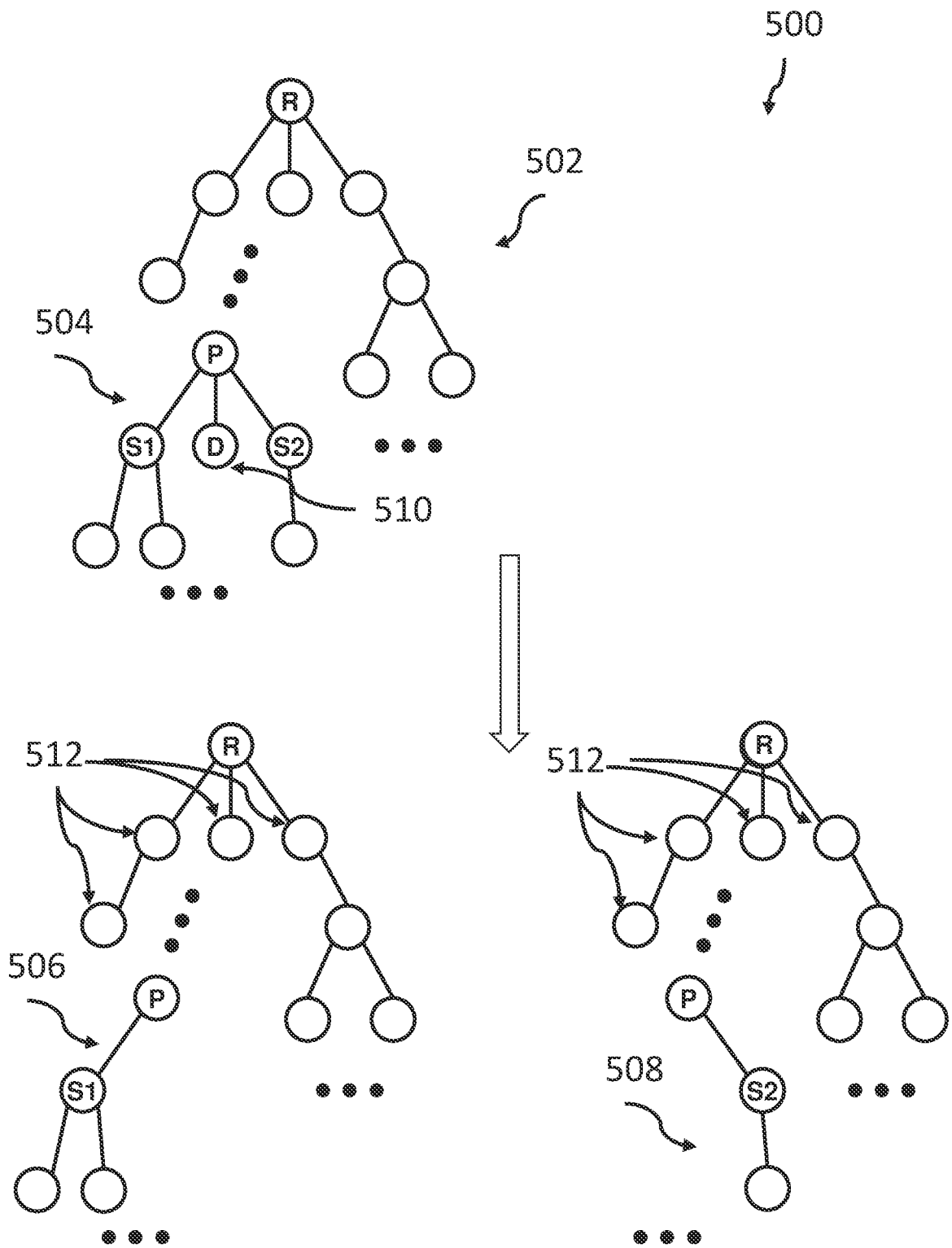
Figure 6:
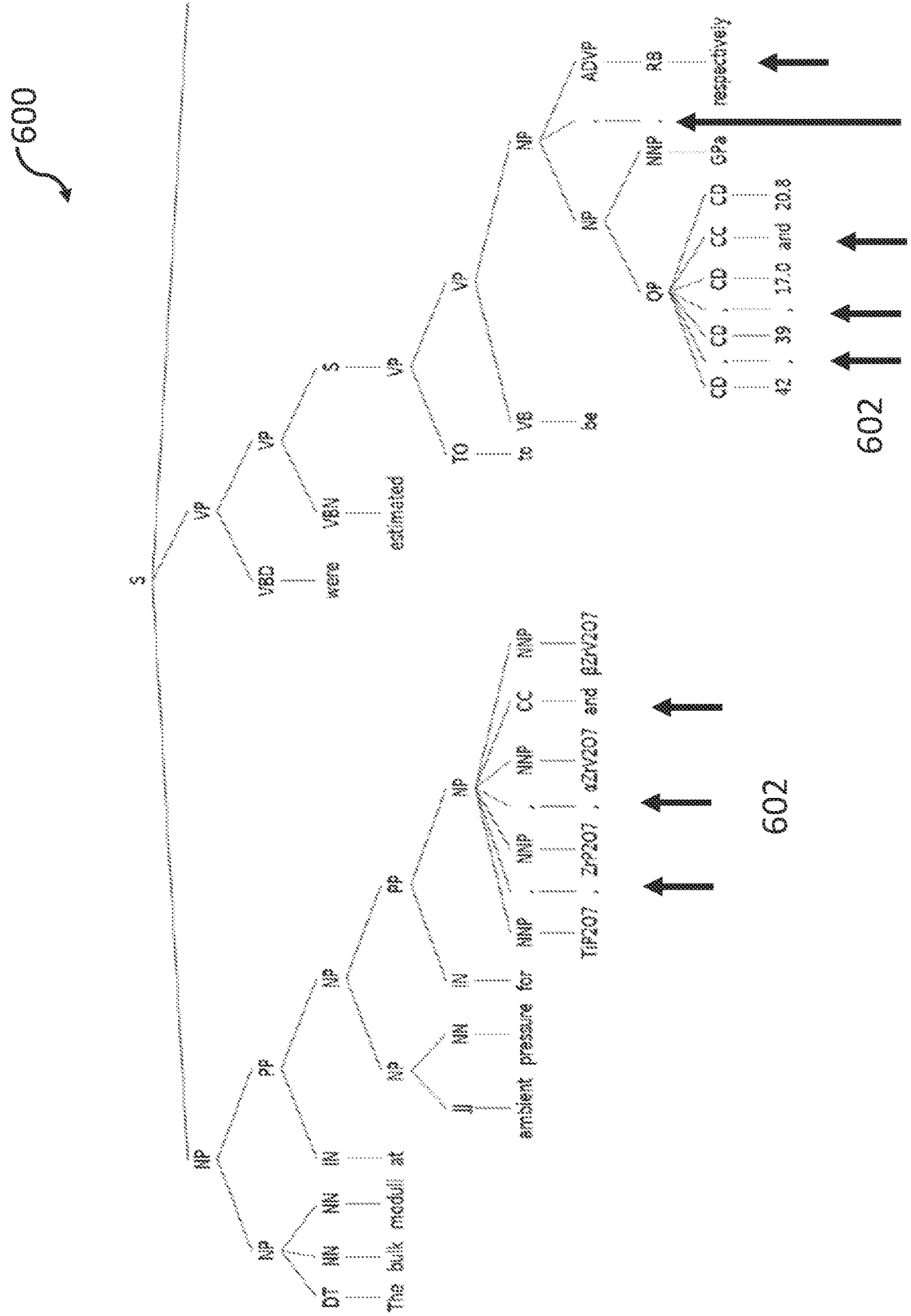
Figure 7:
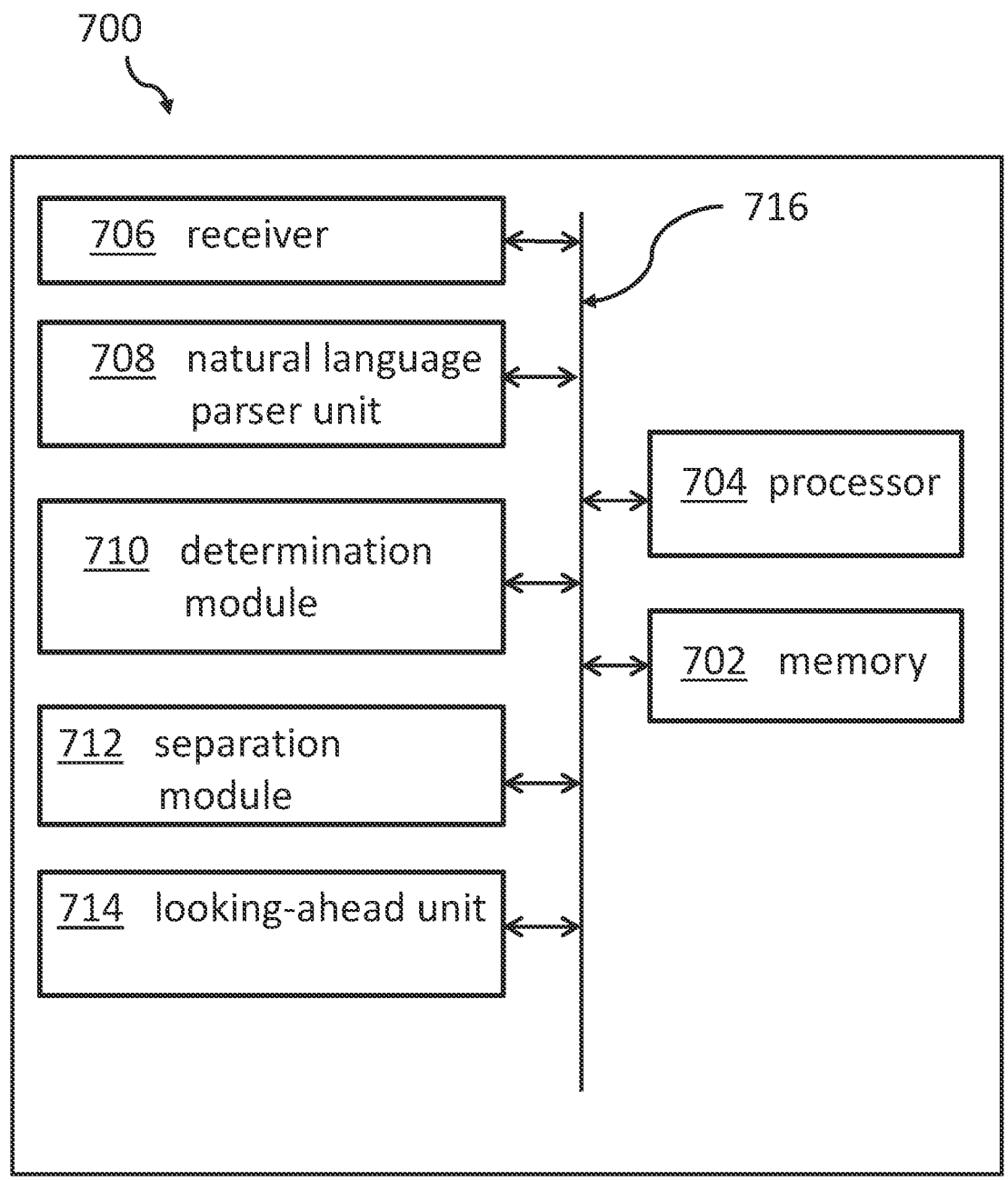
Figure 8:
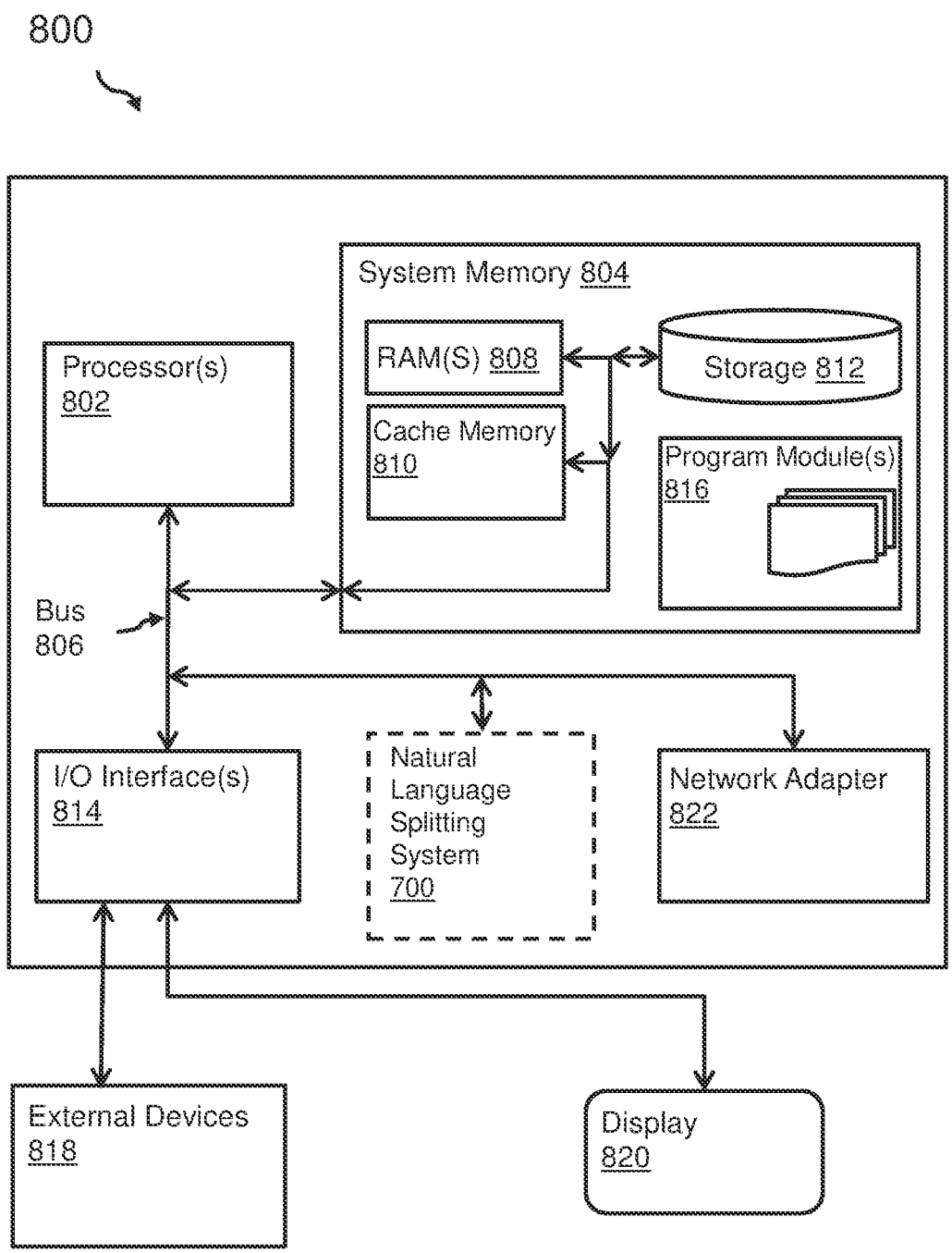
Figure 9:
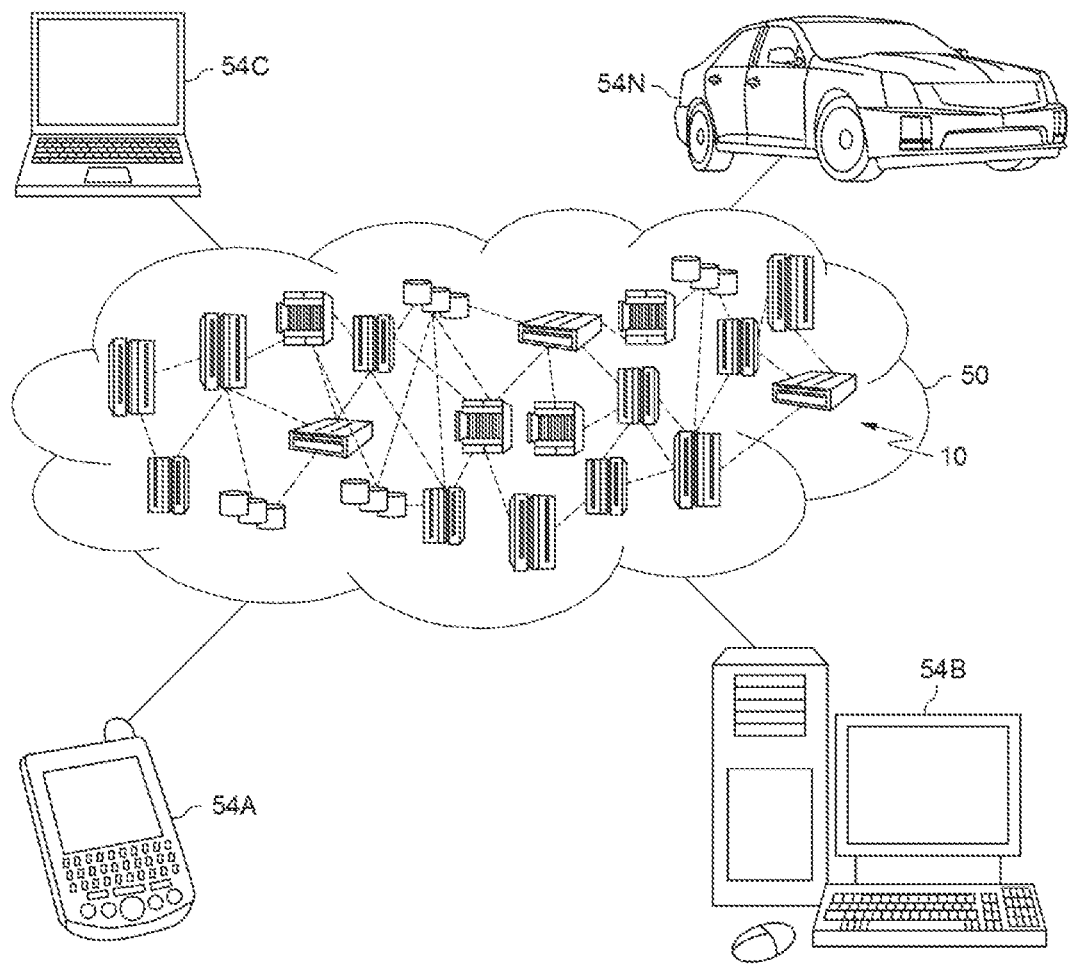
Figure 10:
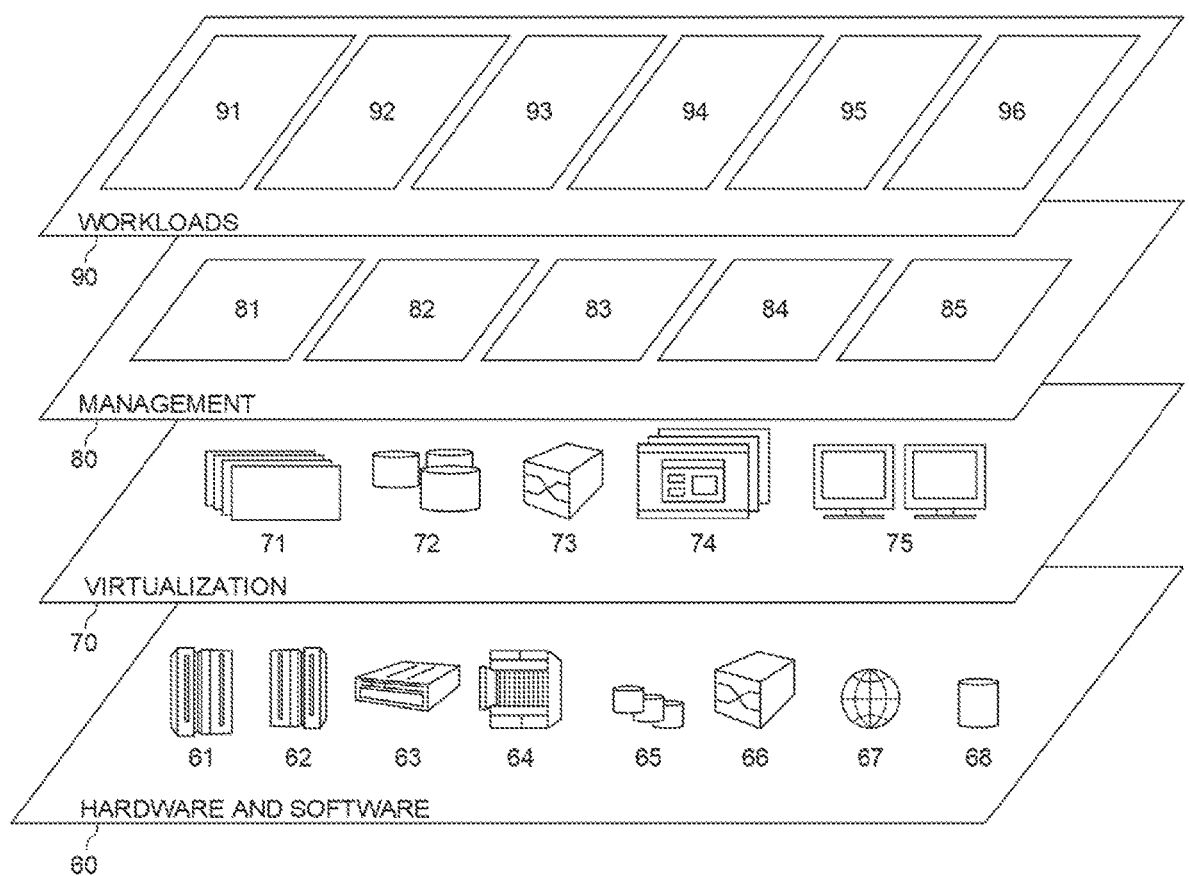

Preferred embodiments of the invention will be described, by way of example only, and with reference to the following drawings:

FIG. 1 shows a block diagram of a computer-implemented method for splitting a natural language sentence into primitive phrases retaining relations of terms, according to an embodiment of the present invention;

FIG. 2 shows a block diagram of an overall system layout, according to an embodiment of the present invention;

FIG. 3 shows a block diagram of a first portion of a flowchart, according to an embodiment of the present invention;

FIG. 4 shows a block diagram of a second portion of a flowchart, according to an embodiment of the present invention;

FIG. 5 shows a diagram of an exemplary split of a tree structure into subtrees, according to an embodiment of the present invention;

FIG. 6 shows an example for a splitting of a more complex sentence, according to an embodiment of the present invention;

FIG. 7 shows a block diagram of the natural language splitting system for splitting a natural language sentence into primitive phrases retaining relations of terms, according to an embodiment of the present invention;

FIG. 8 shows a computing system including the natural language splitting system of FIG. 7, according to an embodiment of the present invention;

FIG. 9 is a block diagram of an illustrative cloud computing environment, according to an embodiment of the present disclosure; and FIG. 10 is a block diagram of functional layers of the illustrative cloud computing environment of FIG. 9, according to an embodiment of the present disclosure.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

In the context of this description, the following terms and/or expressions may be used:

The term 'natural language sentence' may denote a sentence in a linguistic sense or a sentence-like phrase. E.g., a normal sentence may end with a full stop. However, also sentences being separated by semicolons shall be treatable by the here proposed system; and one also needs to consider that, e.g., also numbers including dots between selected digits. In general, also other delimiters and exceptions are possible and should be considerable. The skilled expert may know good examples discussed in the context of sentence boundary disambiguation (SBD), also known as sentence breaking, sentence boundary detection, and sentence segmentation. It is accepted as a known challenge in natural language processing of deciding where sentences begin and end. As in the here proposed case, natural language processing tools often require their input to be divided into sentences; however, sentence boundary identification may be challenging due to the potential ambiguity of punctuation marks. E.g., in written English, a period or full stop may indicate the end of a sentence, or may denote an abbreviation, a decimal point, an ellipsis, or an email address, among other possibilities. Furthermore, question marks and exclamation marks may be similarly ambiguous due to use in emoticons, computer code, and slang. In general, also a paragraph or a sentence-like phrase may be treated as sentences in the context of the here proposed technical solution.

The term 'primitive phrase' may denote, as an example, relating one subject to another or relating a subject to a feature of the subject. Hence, in its simplest form, a primitive phrase may be described as a simple fact formulated in its shortest form. However, also more complex sentence structures may count as primitive phrase because a further separation would destroy the meaning. An example may be: "The bulk moduli at ambient pressure for TiP2O7 were estimated to be 42 GPa."

The term 'relation of terms' may denote the situation in which one term is related to another, as discussed above, for the case of primitive phrases. However, it may also be possible that a relationship of terms may also exist over larger distances in a sentence. A larger distance may denote that the terms are not positioned within a couple of words—e.g., 5 words—but also over a longer distance of words—e.g., 10 words or more.

The term 'parse tree' or parsing tree or derivation tree or concrete syntax tree may denote an ordered, rooted tree that represents the syntactic structure of a string according to some predefined grammar. It may be used here in the sense of known computational linguistics. While parse trees for artificial languages often rely on context-free grammars, and natural language has context-free aspects, fully parsing natural language may require more complex algorithms. Thereby, the parse trees may concretely reflect the syntax of the input language, making them distinct from the abstract syntax trees used in computer programming. The parse trees may usually be constructed based on either the constituency relation or constituency grammars (phrase structure grammars) or the dependency relation of dependency grammars.

The term 'natural language parser' may denote a parsing system capable of scanning a natural language sentence to generate a parse tree. Examples may be a constituency parser or a dependency parser.

The term 'discourse marker' may denote a conjunction, like "and", "or", or "respectively", "as well as", "if", "which", commas in a sequence of equal terms (before the term "and" at the end of a list), negations and the like that may separate some portions of a sentence logically and semantically from other portions of the same sentence. Depending on the underlying language, the discourse markers may be defined in a configuration database together with the relating rules of how to deal with them in the parse tree.

The term 'highest ranking'— in particular highest ranking discourse marker—may denote the discourse marker in the parse tree on the highest level of the parse tree or the first of these in a left to right or right to left order if there are several on the same level.

The term 'basic subtree' may denote a rock-bottom expression of a parse tree i.e., the logical and physical end of a branch of the parse tree including no additional discourse markers; i.e., a basic subtree or basic subtree structure is discourse marker free.

The term 'long ranging discourse marker' may denote a discourse marker influencing the linguistic and logical structure of a complex sentence over a comparably large number of words. In other words, a local discourse marker may impact only its sibling nodes and the nodes under it. A long ranging discourse marker may impact other parts of the tree. As a contrast, short ranging discourse markers may influence portions of the sentence in a direct neighborhood. They may also be denoted as 'local discourse markers'.

The term 'tree automaton' may denote the known type of state machine. And computer linguistics tree automata may deal with tree structures, rather than strings of more traditional state machines. As with classical automata, finite tree automata (FTA) may be either a deterministic automaton or not. According to how the automaton may process the input tree, finite tree automata may be of two types: (a) bottom up, (b) top down. In the context of the here proposed concept, a top down approach is preferred.

In the following, a detailed description of the figures will be given. All instructions in the figures are schematic. Firstly, a block diagram of an embodiment of the inventive computer-implemented method for splitting a natural language sentence into primitive phrases retaining relations of terms is given. Afterwards, further embodiments, as well as embodiments of the natural language splitting system for splitting a natural language sentence into primitive phrases retaining relations of terms, will be described.

FIG. 1 shows a block diagram of a preferred embodiment of the computer-implemented method 100 for splitting a natural language sentence or a paragraph into primitive phrases, which can be a short sentence expressing a relationship between, e.g., two subjects or a subject and a feature (in more complex contexts) retaining relations of terms. The method 100 includes receiving, 102, a natural language sentence, in particular a longer sentence or a sentence-like phrase.

The method 100 may also include building, 104, a parse tree from the natural language sentence using a natural language parser. Thereby, two different types of parsers can be differentiated: a constituency-based parser or a dependency parser. Both types of parsers can be used.

Furthermore, the method 100 includes recursively identifying, 106, discourse markers (later denoted as "D") in subtrees of the parse tree. The procedure typically starts with the highest ranking discourse marker in the parse tree. Thereby, each of the respective subtrees can be separated, 108, at the respective discourse marker using one or more of a set of predefined rules until a set of basic subtrees remains. These basic subtrees shall be discourse marker free.

It may also be mentioned that also the original or starting parse tree can be denoted as subtree in the sense of a starting point of the recursion.

The recursive identification can also include looking-ahead, 110—in particular in the sentence, i.e., in the parse tree—for identifying a long ranging discourse marker before identifying one or more local discourse markers. Local discourse markers may be understood as those that influence only a narrow area within a phrase, wherein a long ranging discourse marker works over longer context within a sentence or also backwards. An example of such long range, backwards oriented discourse marker is the term "respectively".

FIG. 2 shows a block diagram of an overall system layout 200, according to an embodiment of the present invention. The overall system layout 200 may also be seen as a platform 202 description including functional components as well as parts of the underlying process flow.

The flow starts with a text document 204 including natural language sentences in which an optional co-reference resolution 206 may be performed in order to replace expressions like "he", "she", or "it" by a term expressing its original meaning. The co-reference resolution 206 may be part of the splitter 208 or may also be implemented outside the platform 202.

The overall recursion component 210 handles the original parse tree and the multiple (partially overlapping) and immediate subtrees top-down. As a second criterion, the recursion component may also work from left to right (or vice versa) through the parse tree. Through a set of application programming interfaces (APIs) individual language constructs can be analyzed and treated by predefined rules, also denotable as so-called tree transducers.

The usage of the rules, as well as other configuration parameters 214, may be set by a user interface 212 from a domain expert. These configuration parameters 214 can be stored in a special storage system. Besides a constituency parser 216—alternatively, a dependency parser (not directly shown), a discourse marker handler 218—or a plurality thereof—as well as an optional phase recombined at 220 may be accessible by the overall recursion component 210. One special unit, and a look-ahead unit 222, is adapted to look for long ranging discourse markers which may not be treated with the simpler rules for local discourse markers.

Once a sentence of the received text document 204 has been completed, the flow continues from the overall recursion component 210 to the relation extraction unit 224, on which basis a knowledge graph 226 can be built. It may be used as a content providing system or application 228 for many diverse application areas like mineral research, chemical experiments, and so on. Additionally, the knowledge graph may also be manually adapted using the knowledge graph manipulation module 230. This can be accessed via a user interface unit 232 by, e.g., a domain knowledge graph expert.

It may also be mentioned that according to the proposed concept the phrases or sentences can be assembled as a logical structure instead of just a set. Additionally, also a confidence value can be assigned to individual subtrees and phrases and can be combined by the recursion component. Thereby, lower confidence level values can be assigned to subtrees split at "or" than those split at "and".

It may also be noteworthy mentioning that the natural language splitting system, underlying the method 100, may be implemented as a single or a multi-lingual system which may depend on the availability of the constituency (or dependency) parser for a specific language.

It may be worthwhile looking at a couple of small examples in order for a better comprehension of the proposed concept. The goal is to convert a fragment of text into several simple phrases, such that the relatively simple word proximity words can be used to construct a knowledge graph.

The following sentence may be considered: "Apples are healthy, but chocolate is sweeter" versus "Fruit is healthy, such as apples and pears". One should not derive that chocolate is healthy from the first sentence, while one can derive that apples are healthy from the second sentence. In knowledge graph terms, the following relation would be valid here:

(apples, healthy), (chocolate, sweet), vs.

(fruit, healthy), (fruit, apples), (fruit, pears), (healthy, apples), (healthy pears).

This was clearly achieved by a different treatment of the discourse markers "but" and "such as".

In a second example, the following sentence may be used: "Apples and pears are healthy and tasty". This should be used in four relations:

(apples, healthy), (apples, tasty), (pears, healthy), (pears, tasty).

This was achieved by the recursion: firstly splitting the sentence at the first "and" into "Apples are healthy and tasty."; "Pears are healthy and tasty.".

Afterwards, the system may split each of these phrases at the second "and".

FIG. 3 shows a first portion 300 of a flowchart, according to an embodiment of the present invention. Here, the process may start with a configuration parameter setting 302. Then, the input text fragment, e.g., the sentence, is received, 304. The constituency parser is called, 306, to get the input constituency tree I. From there, 308, a set S of split constituency trees is initialized as {I}. In a next step, 310, an unhandled subtree T is selected or picked from S. The first highest discourse marker D in T is to be found, 312. If this is determined to be negative, 314—case "N"—T is marked as handled and final, 316, before the process continues with selecting a next unhandled subtree T from S. Also here, apart from setting the configuration parameters (302), each of the discussed activities would relate to the overall recursion.

In case determination 314 determines that a discourse marker has been found—case "Y"—the process continues at circle "A" on FIG. 4.

FIG. 4 shows a block diagram of a second portion 400 of the flowchart of FIG. 3, according to an embodiment of the present invention. Here, the process continues—starting from point "A" of FIG. 3—with calling the discourse marker handler and for discourse marker type "D" with T, D. Next, a split, 404, of T by D (including parallel elements) is performed. Then, the set S' of smaller subtrees is returned, 406. In a next step, 408, the subtree S' is added to the set S and the subtree T is marked as handled but non-final.

If it is determined, 410—case "Y"—that more unhandled subtrees exist in S, the procedure returns back to the picking, selection 310 of a next unhandled subtree T from the set S (compare FIG. 3).

In case no more unhandled subtrees exist in S—case "N"—a recombination of phrases can be performed, 412, for each final or basic subtree in S. In an additional step, phrases can be output, 414, usually to the relation handler for further processing before the process ends, 416.

It may again be mentioned that the activities 402, 408, 410 and 414 may also be counted to the overall recursion (compare FIG. 3), whereas the activities 404 and 406 relate to the discourse marker handler (compare 218 of FIG. 3).

FIG. 5 shows a diagram 500 of an exemplary split of a subtree structure into smaller subtrees. The exemplary overall parse tree 502 may include a subtree 504 including the discourse marker D 510 and a left subtree with root S1 and a right subtree with root S2. The splitting or separation may result in a subtree containing S1 506 and a second subtree containing S2 508, respectively. Here, one can also see that the component P (parent node) may be present in both subtrees, i.e., overlapping portions may exist. This is also true for all white nodes except those under P—exemplary referred to with reference numeral 512 (only some examples of the nodes have been marked). The node "R" marks the root node of the sentence analysis.

Here, it may be understood that the overall recursion can work top-down so that higher-level discourse markers are handled before sub-ordinate ones. The order of handling disjoint subtrees does not matter, i.e., because such expansions are commutative. However, one may choose to treat them left-to-right/depth-first.

One may read the example, particularly, because a split or separation is carried out for the discourse marker D="and" into two subtrees containing 506 and 508. In other words, the subtree below the discourse marker's parent is split, and each split element is recombined with the rest of the original subtree.

In a more general view and according to a nomenclature, the step "find first highest discourse marker D in T" may exemplary be carried out with the constituency parser TGrep2 grammar. Exemplary, a formula for recognizing a sentence of two sub-sentences structured as "S and S" or "S, and S" may be reviewed:

$$'(S[<(S\$.(CC\$.S))|<(S\$.(/^,\$/\$.(CC\$.S)))])',$$

where:

"S" is the constituency tree element for (sub-)sentences,
"<" indicates that the right term is directly under the left term in the tree, and
"|" is "or".

Hence, here the primary structure is a parent "S", and two alternative constructs under it:

$$S\$.(CC\$.S) \text{ and } S\$.(/^,\$/\$.(CC\$.S))$$

"$" means the sibling relation, and
"." means immediate precedence.

So, the first construct means a sub-sentence, immediately followed by a "CC", i.e., a coordinating conjunction, immediately followed by another sub-sentence.

"/ . . . /" encloses a regular expression, and the "—" and "$" can indicate start and end, so "/^,$/" means a single comma, and the second construct overall is the version for "S, and S".

Therefore, special attention may be given to exceptions of discourse markers that indicate relations between remote subtrees. In the English language, e.g., the term "respectively" is a typical representative term of this class of discourse markers. They have to be treated by the look-ahead component in advance or at least before any other construct (e.g., any "and"/"or" list) that can belong to such a discourse marker is expanded.

If the discourse marker handlers—i.e., according to the configured rules—output also confidence values ("high", or estimated probabilities), the overall recursion can multiply them in successive splits. If not only a set S is built as in the main flow diagram, but a logical structure, then the overall recursion can put the new splits S' correctly into such a structure.

The conjunction "and" can be handled in its basic form as follows: it may be treated by a first rule type concerning conjunctions like "and" and "or". It may be remembered that one does not need only simply the parts before and after, but reasonable phrases for the following knowledge graph extractions.

For example, in Tgrep2 nomenclature "apples and pears are healthy and tasty". This sentence resides in the constituency tree:

| | | |
|---|---|---|
| (S | (NP | (NNS apples) |
| | | (CC and) |
| | (NNS pears)) | |
| | (VP | (VBP are) |
| | (ADJP | (JJ healthy) |
| | | (CC and) |
| | | (JJ tasty)))). |

Typically, one wants to split it into these phrases:
"apples are healthy", "apples are tasty", "pears are healthy", "pears are tasty".

This is achieved by two levels of the overall recursion. At the first "and", it builds two smaller subtrees, each with one subtree of this "and". An example of the first one reads:

```
(S      (NP      (NNS apples))
        (VP      (VBP are)
        (ADJP    (JJ healthy)
                          (CC and)
                          (JJ tasty)))).
```

For each of these two subtrees, the recursion would arrive at the second "and" and split that again.

In case of the conjunction "and" and a longer list and "respectively" the following may apply. A conjunction of more than two elements is usually written with commas,

```
(S      (NP             (NNS Apples)
        (, ,)
        (NNS oranges)
        (, ,)
        (CC and)
        (NNS grapes))
        (VP (VBP are)
        (ADJP (JJ healthy)))).
```

This construction is treated like "and", e.g., three phases are generated here. Thus, the handler for "and" also has to interpret commas at the same level of the grammar tree.

The term "respectively" changes the logic significantly, and this necessitates analyzing looking-ahead before handling any "and" as will become comprehendible with the subsequent paragraphs.

Let's consider the sentence "Lentils and white beans have to be cooked for 20 minutes and two hours, respectively.":

```
(S (NP (NP (NNS Lentils))
    (CC and)
    (NP (JJ white)
        (NNS beans)))
    (VP (VBP have)
    (S (VP (TO to)
    (VP (VB be)
        (VP (VBN cooked)
        (PP (IN for)
            (NP (NP (NP (CD 20)
                (NNS minutes))
                (CC and)
                (NP (CD 2)
                (NNS hours)))
            (, ,)
            (ADVP (RB respectively)))))))))).
```

If "respectively" or "resp." is present one level up from "and" with the chosen parser, another "and" construction occurs earlier in the same sentence, no further "and" occurs in between, and the lists are of equal length, the procedure is to split both lists at the same time. Thus, one gets
"lentils have to be cooked for 20 minutes",
"white beans have to be cooked for two hours"

If there is more one "and", e.g., as in "for salads and soups, lentils and white beans have to be cooked for 20 minutes and two hours, respectively", things become even more complicated. If only one preceding "and"-list has the same length as the "respectively" list, that one is chosen. Otherwise, the closest preceding list is chosen.

The same choice can be made across multiple sentences if no suitable "and" is found for a "respectively" list ("no suitable partner for "respectively""). Let's considers the following small paragraph: "Salads become more nourishing by adding lentils or white beans. They first have to be cooked for 20 minutes and two hours respectively." On the one hand, here the preceding list comprises "or", not "and", but as the sole suitable list, it has to be considered.

Another useful feature here is to have co-reference resolution first; then, the second sentence can first be replaced by "lentils or white beans first have to be cooked for 20 minutes and two hours, respectively, and the cross-sentence handling is not needed. This also helps subsequent relation extractions.

Additionally, the case of "respectively omitted" has to be considered. This may happen in informal texts, and its grammar tree looks exactly like the first example above ("apples and pears are healthy and tasty"), so it is not possible to clearly distinguish this. However one can give the cross-combinations in parallel-looking list slightly lower confidence values.

FIG. 6 shows a realistic example 600 for a splitting of a more complex sentence. The example relates to characteristics of chemical compounds: "The bulk moduli at ambient pressure for $TiP_2O_7$, $ZrP_2O_7$, $\alpha ZrV_2O_7$ and $\beta ZrV_2O_7$ were estimated to be 42, 39, 17.0 and 20.8 GPa (giga pascal), respectively." A corresponding diagram is shown in FIG. 6. The discourse markers 602 are indicated as vertical bold arrows.

The simplified sentences derived would read as follows:
The bulk moduli at ambient pressure for $TiP_2O_7$ were estimated to be 42 GPa.
The bulk moduli at ambient pressure for $ZrP_2O_7$ were estimated to be 39 GPa.
The bulk moduli at ambient pressure for $\alpha ZrV_2O_7$ were estimated to be 17.0 GPa.
The bulk moduli at ambient pressure for $\beta ZrV_2O_7$ were estimated to be 20.8 GPa.

Also for the conjunction "or" (similar with "either") one has to define specific rules. For a use on scientific texts, it can be treated like "and". Let's, e.g., consider the sentence: "mineral M can be found at A or B". This can reasonably be split into "Mineral M can be found at A" and "Mineral M can be found at B". This is comparably easy and can be derived from the above discussed examples.

In less format texts, "or" can represent uncertainty, e.g., let's consider building a bird observation graph, and a person stated: "At place P, I saw a song thrush or a mistle thrush".

One could decide to completely ignore the or-statements in such an application. However, many people might not be able to uniquely identify (and thus more interesting) birds, so one might give both possible observations confidence value 0.5, and handle the confidence values in the subsequent statistical graph building, e.g., by aggregating several observations.

To enable all these cases, there has to be a confidence parameter for "or" in the system settings (i.e., configuration parameters), which could be set to 1, 0, and 0.5 in the three above-discussed scenarios; or better, for the case of multi-element or-lists, the setting would be "probability" instead of "0.5", indicating that the confidence values of the elements should be added up to 1 (e.g., with 4 possible birds, each would have a confidence value of 0.25).

Other simpler conjunctions can be handled as follows: "as well as" can be treated like "and", and fortunately already available as a conjunction phrase in the constituency tree, to simplify its recognition as a discourse marker:

(CONJP (RB as) (RB well) (IN as)).

"but" or "yet" by itself (without negation) is typically a restricting explanation, and can be ignored. E.g., let's consider: "Mineral M can also be found at C, but in deeper strata".

For knowledge graph purposes, this can be shortened to: "Mineral M can be found at C in deeper strata". It shall be noted that also the term "also" has been removed here for readability—for the knowledge graph, it does not matter as the extracted elements will be M, C, and possibly "deeper strata".

"because" etc. (reason) can also be ignored. E.g., in this sentence: "Apples are healthy because they contain vitamin C", all relations between apples, healthy, and vitamin C are valid.

Negations can be treated as follows: Clearly, for relation extraction, one has to be careful with negations. The easiest solution for automatic relation-building, if one has enough data overall, is to remove sentences with any negation. But one can also retain positive sentence parts, e.g., here one can retain "chocolate are tasty" and "cream are tasty":

| (S | (NP (NN Chocolate) | | |
|---|---|---|---|
| | (CC and) | | |
| | (NN cream)) | | |
| | (VP | (VBP are) | |
| | (ADJP | (ADJP (JJ tasty)) | |
| | | (CC and) | |
| | | (RB not) | |
| | | (ADJP (JJ healthy)))) (. .)). | |

The negation in this tree is just an adverb ("RB") at the same level as "and"; so, the order of the children of the parent node ("ADJP") is important.

If negative relations are also desired in the knowledge graph, then of course negations have to be retained, but need be specifically annotated. As this is intended as general preprocessing, independent of the application domain, one makes no attempt to replace negations by positive opposites, like "unhealthy", but that could also be considered.

Finally, certain conditions can be treated with special care. For example, the sentence below can be treated as follows:

| ((S | (SBAR | (IN If) | |
|---|---|---|---|
| | (S | (NP (NNS apples)) | |
| | (VP (VBP are) | | |
| | | (ADJP (JJ brown) | |
| | | | (CC and) |
| | | | (JJ soft))))) |
| | (, ,) | | |
| | (NP | (PRP they)) | |
| | (VP | (VBP are) | |
| | (ADJP (JJ foul)))). | | |

One does not want to derive "apples are brown" or "apples are foul", at least not as general statements as in the unconditional sentences in the previous sections.

One option is to give the derivable phrases a low confidence value, as possibilities what apples can be, but may not usually be. (A used pre-processor has "no idea" about actual probabilities in conditional statements).

Subsequently, if the following relation building is capable of interpreting conditions, then the statements can actually be retained as logical "IF". I.e., if this is done, subsequent handling of "and" and "or" within the premise has to follow correct logic; one cannot use the base handling of "and" to derive that if apples are brown, they are foul.

Further rules should be directed to temporal clauses which can also have an aspect of a condition, so they require similar caution, e.g., in "when apples are ripe, they are tasty".

Finally, relative clauses—restrictive and non-restrictive—shall be looked at:

The English language distinguishes restrictive (as known as defining) and non-restrictive clauses. If one can assume that the writers of the underlying material know the difference and use the same syntax rules (they can be different in British and American English), these clauses can be treated differently. The following examples shall be considered:

Restrictive:

| (S | (NP | (NP | (NNS Grapes)) | |
|---|---|---|---|---|
| | (SBAR | | (WHNP (WDT that)) | |
| | | | (S (VP (VBP grow) | |
| | | | (PP (IN in) | |
| | | | (NP | (DT the) |
| | | | | (NN north))) )))) |
| | (VP (VBP are) | | | |
| | (ADJP (JJ sour))) (. .)). | | | |

This has to be treated like a condition, i.e., one cannot infer that grapes grow in the north, or are sour, except as possibilities.

And, Non-Restrictive:

| (S | (NP | (NP ( | NNS Lemons)) | |
|---|---|---|---|---|
| | (, ,) | | | |
| | (SBAR | | (WHNP (WDT which)) | |
| | | | (S | (VP (VBP are) |
| | | | | (ADJP (VBN related) |
| | | | | (PP (TO to) |
| | | | | (NP (NNS oranges))) )))) |
| | (, ,)) | | | |
| | (VP | (VBP are) | | |
| | | (ADJP (JJ yellow))) (. .)) | | |

This can be treated as two true statements "Lemons are related to oranges" and "Lemons are yellow."

FIG. 7 shows a block diagram of an embodiment of a natural language splitting system 700 for splitting a natural language sentence into primitive phrases retaining relations of terms. The system includes a memory 702 and a processor 704 operatively coupled to the memory 702. Thereby, the memory 702 stores program code portions that, if executed by the processor 704, enable the processor 704 to receive—e.g., by receiver 706—a natural language sentence, and build a parse tree from the natural language sentence using a natural language parser unit 708.

The stored program code portion can also enable the processor 704 to recursively identify—in particular by a recursively operating determination module 710—discourse markers in subtrees of the parse tree, starting with the highest ranking discourse marker in the parse tree. Thereby, the stored program code portion can also enable the processor 704 to separate—in particular by a separation module 712—each of the respective subtree at the respective discourse marker using a set of predefined rules until a set of basic subtrees remains.

Furthermore, the recursive identification includes looking-ahead—in particular by using a looking-ahead unit 714—for identifying long ranging discourse markers before identifying local discourse markers.

The units and modules implemented in hardware, in particular, the receiver 706, the natural language parser unit 708, the determination module 710, the separation module 712, the looking-ahead unit 714, as well as the memory 702 and the processor 704—may be electrically coupled to each other for signal and/or data exchange. Alternatively, the just-mentioned units and modules can also be connected to a system internal bus system 716 for an orchestrated signal and data exchange under the control of the processor.

Embodiments of the present invention provide a computer-implemented method for splitting a natural language sentence into primitive phrases retaining relations of terms, the method including receiving a natural language sentence, building a parse tree from the natural language sentence using a natural language parser, recursively identifying discourse markers in subtrees of the parse tree, starting with the highest ranking discourse marker in the parse tree, thereby separating each of the respective subtree at the respective discourse marker using a set of predefined rules until a set of basic subtrees remain, where the recursive identification includes looking-ahead for identifying long ranging discourse markers before identifying local discourse markers.

A tree automaton is used for the recursive identification of the discourse markers and/or the separation of each of the respective subtrees into the set of basic subtrees. Each component of the set of basic subtree represents a basic relation of terms.

The method further includes recombining basic phrases based on the set of basic subtrees.

The method further includes extracting relations from the set of basic subtrees.

The method further includes building a knowledge graph using the extracted relations as input.

The method further includes resolving co-references in the natural language sentence before performing the recursive identification.

The method further includes using a configuration component for configuring domain specific terms and/or parameters for selecting a rule out of a set of rules for a discourse marker.

The method further includes separating a longer natural language text into separate natural language sentences or natural language phrases.

According to the proposed method, the parse tree is either a constituency-based parse tree or a dependency-based parse tree.

The method further includes building the constituency-based parse tree using as constituency parser at least one of a Benepar constituency parser, a Stanford coreNLP constituency parser, a Natural language toolkit constituency parser, and an AllenNLP constituency parser.

The method further includes combining a parse tree portion directly related to a discourse marker directly before and after with a portion of the parse tree excluding the of the parse tree portion directly related to the discourse marker.

According to the proposed method, the recursive identification of the discourse markers is carried out from one side of the parse tree to another side.

Embodiments of the present invention may also provide a natural language splitting system for splitting a natural language sentence into primitive phrases retaining relations of terms, including a memory and a processor operatively coupled to the memory, the memory stores program code portions that, if executed by the processor, enable the processor to receive a natural language sentence, build a parse tree from the natural language sentence using a natural language parser, recursively identify discourse markers in subtrees of the parse tree, starting with the highest ranking discourse marker in the parse tree, thereby separating each of the respective subtree at the respective discourse marker using a set of predefined rules, until a set of basic subtrees remains, wherein the recursive identification comprises looking-ahead for identifying long ranging discourse markers before identifying local discourse markers.

According to the proposed system, a tree automaton system performs the recursive identification of the discourse markers and/or the separation of each of the respective subtrees into the set of basic subtrees.

According to the proposed system, each component of the set of basic subtree represents a basic relation of terms.

According to the proposed system, the program code portions that, if executed by the processor, enable the processor to recombine basic phrases based on the set of basic subtrees.

According to the proposed system, the program code portions that, if executed by the processor, enable the processor to extract relations from the set of basic subtrees.

According to the proposed system, the program code portions that, if executed by the processor, enable the processor to build a knowledge graph using the extracted relations as input.

According to the proposed system, the program code portions that, if executed by the processor, enable the processor to resolve co-references in the natural language sentence before performing the recursive identification.

According to the proposed system, the program code portions that, if executed by the processor, enable the processor to use a configuration component for configuring domain specific terms and/or parameters for selecting a rule out of a set of rules for a discourse marker.

According to the proposed system, the program code portions that, if executed by the processor, enable the processor to separate a longer natural language text into separate natural language sentences or natural language phrases.

According to the proposed system, the parse tree is either a constituency-based parse tree or a dependency-based parse tree.

According to the proposed system, the program code portions that, if executed by the processor, enable the processor to combine a parse tree portion directly related to a discourse marker with a portion of the parse tree excluding the parse tree portion directly related to the discourse marker.

Another embodiment of the present invention provides a computer program product for splitting a natural language sentence into primitive phrases retaining relations of terms, the computer program product including a computer readable storage medium having program instructions embodied therewith, the program instructions being executable by one or more computing systems or controllers to cause the one or more computing systems to receive, one or more computing systems or controllers, a natural language sentence, build, one or more computing systems or controllers, a parse tree from the natural language sentence using a natural language parser, recursively identify, one or more computing systems or controllers, discourse markers in subtrees of the parse tree, starting with the highest ranking discourse marker in the parse tree, thereby separating each of the respective subtree at the respective discourse marker using a set of predefined rules until a set of basic subtrees remains, the recursive identification includes looking-ahead for identifying long ranging discourse markers before identifying local discourse markers.

Embodiments of the present invention may be implemented together with virtually any type of computer, regardless of the platform being suitable for storing and/or executing program code. FIG. 8 shows, as an example, a computing system 800 suitable for executing program code related to the proposed method.

The computing system 800 is only one example of a suitable computer system, and is not intended to suggest any limitation as to the scope of use or functionality of embodiments of the invention described herein, regardless, whether the computer system 800 is capable of being implemented and/or performing any of the functionality set forth hereinabove. In the computer system 800, there are components, which are operational with numerous other general purpose or special purpose computing system environments or configurations. Examples of well-known computing systems, environments, and/or configurations that may be suitable for use with computer system/server 800 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 800 may be described in the general context of computer system-executable instructions, such as program modules, being executed by a computer system 800. Generally, program modules may include routines, programs, objects, components, logic, data structures, and so on that perform particular tasks or implement particular abstract data types.

Computer system/server 800 may be practiced in distributed cloud computing environments where tasks are performed by remote processing devices that are linked through a communications network. In a distributed cloud computing environment, program modules may be located in both, local and remote computer system storage media, including memory storage devices.

As shown in the figure, computer system/server 800 is shown in the form of a general-purpose computing device. The components of computer system/server 800 may include, but are not limited to, one or more processors or processing units 802, a system memory 804, and a bus 806 that couple various system components including system memory 804 to the processor 802. Bus 806 represents one or more of any of several types of bus structures, including a memory bus or memory controller, a peripheral bus, an accelerated graphics port, and a processor or local bus using any of a variety of bus architectures. By way of example, and not limiting, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 800 typically includes a variety of computer system readable media. Such media may be any available media that is accessible by computer system/server 800, and it includes both, volatile and non-volatile media, removable and non-removable media.

The system memory 804 may include computer system readable media in the form of volatile memory, such as random access memory (RAM) 808 and/or cache memory 810. Computer system/server 800 may further include other removable/non-removable, volatile/non-volatile computer system storage media. By way of example only, a storage system 812 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 806 by one or more data media interfaces. As will be further depicted and described below, memory 804 may include at least one program product having a set (e.g., at least one) of program modules that are configured to carry out the functions of embodiments of the invention.

The program/utility, having a set (at least one) of program modules 816, may be stored in memory 804 by way of example, and not limiting, as well as an operating system, one or more application programs, other program modules, and program data. Each of the operating systems, one or more application programs, other program modules, and program data or some combination thereof, may include an implementation of a networking environment. Program modules 816 generally carry out the functions and/or methodologies of embodiments of the invention, as described herein.

The computer system/server 800 may also communicate with one or more external devices 818 such as a keyboard, a pointing device, a display 820, etc.; one or more devices that enable a user to interact with computer system/server 800; and/or any devices (e.g., network card, modem, etc.) that enable computer system/server 800 to communicate with one or more other computing devices. Such communication can occur via Input/Output (I/O) interfaces 814. Still yet, computer system/server 800 may communicate with one or more networks such as a local area network (LAN), a general wide area network (WAN), and/or a public network (e.g., the Internet) via network adapter 822. As depicted, network adapter 822 may communicate with the other components of the computer system/server 800 via bus 806. It should be understood that, although not shown, other hardware and/or software components could be used in conjunction with computer system/server 800. Examples, include, but are not limited to: microcode, device drivers, redundant processing units, external disk drive arrays, RAID systems, tape drives, and data archival storage systems, etc.

Additionally, the natural language splitting system 700 for splitting a natural language sentence into primitive phrases retaining relations of terms may be attached to the bus system 806.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 9, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 9 are intended to be illustrative only and that computing nodes 10 and cloud computing environment 50 can communicate with any type of computerized device over any type of network and/or network addressable connection (e.g., using a web browser).

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and system for automated natural language splitting for generation of knowledge graphs 96.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be embodied as a system, a method, and/or a computer program product. The computer program product may include a computer readable storage medium (or media) having computer readable program instructions thereon for causing a processor to carry out aspects of the present invention.

The medium may be an electronic, magnetic, optical, electromagnetic, infrared or a semi-conductor system for a propagation medium. Examples of a computer-readable medium may include a semi-conductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W), DVD and Blu-Ray-Disk.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disk read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object-oriented programming language such as Smalltalk, C++ or the like, and typical procedural programming languages, such as the "C" programming language or similar programming languages. The computer readable program instructions may execute entirely on the user's computer, partly on the user's computer as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatuses, or another device to cause a series of operational steps to be performed on the computer, other programmable apparatus or other device to produce a computer implemented process, such that the instructions which execute on the computer, other programmable apparatuses, or another device implement the functions/acts specified in the flowchart and/or block diagram block or blocks.

The flowcharts and/or block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or act or carry out combinations of special purpose hardware and computer instructions.

The terminology used herein is for the purpose of describing particular embodiments only and is not intended to limit the invention. As used herein, the singular forms "a", "an" and "the" are intended to include the plural forms as well, unless the context clearly indicates otherwise. It will further be understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer-implemented method for splitting a natural language sentence into primitive phrases retaining relations of terms, the method comprising:
    receiving, by one or more processors, a natural language sentence;
    building, by the one or more processors, a parse tree from the natural language sentence using a natural language parser; and
    recursively identifying, by the one or more processors, discourse markers in subtrees of the parse tree using a top-down tree automata, starting with a highest ranking discourse marker in the parse tree to separate each of a respective subtree at a respective discourse marker using a set of predefined rules until a set of basic subtrees remains, the remaining set of basic subtrees being discourse marker free, wherein the recursive identification of the discourse markers comprises looking-ahead for identifying long ranging discourse markers before identifying local discourse markers, the recursive identification of the discourse markers being carried out from one side of the parse tree to another side of the parse tree;
    combining, by the one or more processors, a first portion of the parse tree related to a discourse marker with a second portion of the parse tree excluding the first portion of the parse tree related to the discourse marker, the first portion of the parse tree being located directly before and directly after the discourse marker, the first portion of the parse tree related to the discourse marker partially overlapping with the second portion of the parse tree excluding the first portion of the parse tree related to the discourse marker; and
    building, by the one or more processors, a knowledge graph using relations of terms extracted from the set of basic subtrees as input, the knowledge graph being communicatively connected to a user interface unit.

2. The method according to claim 1, wherein the top-down tree automata is used for the recursive identification of at least one of the discourse markers and the separation of each of the respective subtrees into the set of basic subtrees.

3. The method according to claim 1, wherein each component of the set of basic subtree represents a basic relation of terms.

4. The method according to claim 1, further comprising:
recombining, by the one or more processors, basic phrases based on the set of basic subtrees.

5. The method according to claim 1, wherein the knowledge graph comprises a domain specific knowledge graph.

6. The method according to claim 1, wherein the user interface unit allows manually adapting the knowledge graph.

7. The method according to claim 1, further comprising:
resolving, by the one or more processors, co-references in the natural language sentence before performing the recursive identification.

8. The method according to claim 1, further comprising:
using, by the one or more processors, a configuration component for at least one of configuring domain specific terms and parameters for selecting a rule out of a set of rules for a discourse marker.

9. The method according to claim 1, further comprising:
separating, by the one or more processors, a longer natural language text into at least one of separate natural language sentences and natural language phrases.

10. The method according to claim 1, wherein the parse tree is at least one of a constituency-based parse tree and a dependency-based parse tree.

11. The method according to claim 10, further comprising:
building, by the one or more processors, the constituency-based parse tree using as constituency parser at least one of a Benepar constituency parser, a Stanford coreNLP constituency parser, a Natural language toolkit constituency parser, and an AllenNLP constituency parser.

12. The method according to claim 1, wherein the recursive identification of the discourse markers being carried out from one side of the parse tree to another side is performed in addition to a top-down approach, wherein carrying out the recursive identification from the one side of the parse tree to another side further includes proceeding from at least one of left to right and right to left of the parse tree with depth coming first.

13. A natural language splitting system for splitting a natural language sentence into primitive phrases retaining relations of terms, the natural language splitting system comprising: one or more processors, one or more computer-readable memories, one or more computer-readable tangible storage devices, and program instructions stored on at least one of the one or more storage devices for execution by at least one of the one or more processors via at least one of the one or more memories, wherein the natural language splitting system is capable of performing a method comprising:
receiving, by one or more processors, a natural language sentence;
building, by one or more processors, a parse tree from the natural language sentence using a natural language parser; and
recursively identifying, by the one or more processors, discourse markers in subtrees of the parse tree using a top-down tree automata, starting with a highest ranking discourse marker in the parse tree to separate each of a respective subtree at a respective discourse marker using a set of predefined rules until a set of basic subtrees remains, the remaining set of basic subtrees being discourse marker free, wherein the recursive identification of the discourse markers comprises looking-ahead for identifying long ranging discourse markers before identifying local discourse markers, the recursive identification of the discourse markers being carried out from one side of the parse tree to another side of the parse tree;
combining, by the one or more processors, a first portion of the parse tree related to a discourse marker with a second portion of the parse tree excluding the first portion of the parse tree related to the discourse marker, the first portion of the parse tree being located directly before and directly after the discourse marker, the first portion of the parse tree related to the discourse marker partially overlapping with the second portion of the parse tree excluding the first portion of the parse tree related to the discourse marker; and
building, by the one or more processors, a knowledge graph using relations of terms extracted from the set of basic subtrees as input, the knowledge graph being communicatively connected to a user interface unit.

14. The natural language splitting system according to claim 13, wherein the top-down tree automata is used for the recursive identification of at least one of the discourse markers and the separation of each of the respective subtrees into the set of basic subtrees.

15. The natural language splitting system according to claim 13, wherein each component of the set of basic subtree represents a basic relation of terms.

16. The natural language splitting system according to claim 13, further comprising:
recombining, by the one or more processors, basic phrases based on the set of basic subtrees.

17. The natural language splitting system according to claim 13, wherein the knowledge graph comprises a domain specific knowledge graph.

18. The natural language splitting system according to claim 13, wherein the user interface unit allows manually adapting the knowledge graph.

19. The natural language splitting system according to claim 13, further comprising:
resolving, by the one or more processors, co-references in the natural language sentence before performing the recursive identification.

20. The natural language splitting system according to claim 13, further comprising:
using, by the one or more processors, a configuration component for at least one of configuring domain specific terms and parameters for selecting a rule out of a set of rules for a discourse marker.

21. The natural language splitting system according to claim 13, further comprising:
separating, by the one or more processors, a longer natural language text into at least one of separate natural language sentences and natural language phrases.

22. The natural language splitting system according to claim 13, wherein the parse tree is at least one of a constituency-based parse tree and a dependency-based parse tree.

23. A computer program product for splitting a natural language sentence into primitive phrases retaining relations of terms, the computer program product comprising: one or more computer readable storage media, and program instructions collectively stored on the one or more computer readable storage media, the program instructions comprising:

program instructions to receive, by one or more processors, a natural language sentence;

program instructions to build, by the one or more processors, a parse tree from the natural language sentence using a natural language parser;

program instructions to recursively identify, by the one or more processors, discourse markers in subtrees of the parse tree using a top-down tree automata, starting with a highest ranking discourse marker in the parse tree to separate each of a respective subtree at a respective discourse marker using a set of predefined rules until a set of basic subtrees remains, the remaining set of basic subtrees being discourse marker free, wherein the recursive identification of the discourse markers comprises looking-ahead for identifying long ranging discourse markers before identifying local discourse markers, the recursive identification of the discourse markers being carried out from one side of the parse tree to another side of the parse tree;

program instructions to combine, by the one or more processors, a first portion of the parse tree related to a discourse marker with a second portion of the parse tree excluding the first portion of the parse tree related to the discourse marker, the first portion of the parse tree being located directly before and directly after the discourse marker, the first portion of the parse tree related to the discourse marker partially overlapping with the second portion of the parse tree excluding the first portion of the parse tree related to the discourse marker; and program instructions to build, by the one or more processors, a knowledge graph using relations of terms extracted from the set of basic subtrees as input, the knowledge graph being communicatively connected to a user interface unit.

\* \* \* \* \*